US012356978B2

(12) United States Patent
Kastl et al.

(10) Patent No.: US 12,356,978 B2
(45) Date of Patent: Jul. 15, 2025

(54) SYSTEM AND APPARATUS FOR PROVIDING VARIABLE RATE APPLICATION OF APPLICANTS TO DISCRETE FIELD LOCATIONS

(71) Applicant: Valmont Industries, Inc., Omaha, NE (US)

(72) Inventors: John Kastl, Wahoo, NE (US); Jacob L. LaRue, Owasso, OK (US)

(73) Assignee: Valmont Industries, Inc.

( * ) Notice: Subject to any disclaimer, the term of this patent is extended or adjusted under 35 U.S.C. 154(b) by 30 days.

(21) Appl. No.: 18/469,737

(22) Filed: Sep. 19, 2023

(65) Prior Publication Data
US 2024/0000059 A1    Jan. 4, 2024

Related U.S. Application Data

(63) Continuation of application No. 16/899,704, filed on Jun. 12, 2020, now Pat. No. 11,800,861.
(Continued)

(51) Int. Cl.
*A01M 7/00* (2006.01)
*A01B 79/00* (2006.01)
(Continued)

(52) U.S. Cl.
CPC ......... *A01M 7/0089* (2013.01); *A01B 79/005* (2013.01); *A01C 21/005* (2013.01); *A01C 23/047* (2013.01); *G06V 20/188* (2022.01)

(58) Field of Classification Search
CPC . A01M 7/0089; G06V 20/188; A01C 21/005; A01C 23/047
See application file for complete search history.

(56) References Cited

U.S. PATENT DOCUMENTS 5,884,224 A    3/1999    McNabb et al.
8,434,697 B1    5/2013    Olt
(Continued)

FOREIGN PATENT DOCUMENTS

EP    2095259 A2    9/2009
EP    3046066 A1    7/2016
(Continued)

OTHER PUBLICATIONS

King et al., "Center-Pivot Irrigation System for Independent Site-Specific Management of Water and Chemical Application", 2009 American Society of Agricultural and Biological Engineers ISSN 0883-8542.

*Primary Examiner* — Tara Mayo
(74) *Attorney, Agent, or Firm* — Milligan PC LLO (57) ABSTRACT

The present invention provides a system, method and apparatus for providing variable rate application of applicants to discrete field locations. According to a first preferred embodiment, the present invention includes a control device having software modules to allow for the execution of irrigation and chemical spray patterns according to specific prescriptions for each crop being sprayed. According to further preferred embodiments, the control device may use data from a variety of image sensors to create a selective, variable rate application of applicants. Using the imaging data, the system of the present invention may use a primary applicant system to broadly deliver a first selected application (e.g. water or the like) and use a separate system to deliver targeted applicants for specific plants or areas of a given field.

23 Claims, 10 Drawing Sheets

Related U.S. Application Data (60) Provisional application No. 62/867,338, filed on Jun. 27, 2019.

(51) Int. Cl.
*A01C 21/00* (2006.01)
*A01C 23/04* (2006.01)
*G06V 20/10* (2022.01)

(56) References Cited

U.S. PATENT DOCUMENTS

| | | |
|---|---|---|
| 2008/0140431 A1 | 6/2008 | Anderson et al. |
| 2010/0286973 A1 | 11/2010 | Messina et al. |
| 2013/0018553 A1 | 1/2013 | Malsam |
| 2015/0272017 A1 | 10/2015 | Hedley et al. |
| 2015/0278966 A1 | 10/2015 | Johnson |
| 2015/0370935 A1 | 12/2015 | Starr |
| 2016/0202227 A1 | 7/2016 | Mathur et al. |
| 2016/0307448 A1 | 10/2016 | Salnikov et al. |
| 2016/0334276 A1 | 11/2016 | Pluvinage |
| 2017/0251589 A1* | 9/2017 | Tippery et al. .......... A01B 3/50 |
| 2017/0270446 A1 | 9/2017 | Starr et al. |
| 2018/0129175 A1 | 5/2018 | Jennings et al. |
| 2018/0348714 A1 | 12/2018 | LaRue |

FOREIGN PATENT DOCUMENTS

| | | |
|---|---|---|
| EP | 3160220 A1 | 5/2017 |
| EP | 3356799 A1 | 8/2018 |
| WO | 2008073296 A2 | 6/2008 |
| WO | 2014014850 A2 | 1/2014 |
| WO | 2016061169 A1 | 4/2016 |
| WO | 2016077883 A1 | 5/2016 |
| WO | 2016154482 A1 | 9/2016 |
| WO | 2016181403 A1 | 11/2016 |

* cited by examiner

SYSTEM AND APPARATUS FOR PROVIDING VARIABLE RATE APPLICATION OF APPLICANTS TO DISCRETE FIELD LOCATIONS

RELATED APPLICATIONS

The present application claims priority to U.S. Provisional Application No. 62/867,338 filed Jun. 27, 2019.

BACKGROUND AND FIELD OF THE PRESENT INVENTION

Field of the Present Invention

The present invention relates generally to irrigation machines and, more particularly, to a system, method and apparatus for collecting precise, near real-time data, creating recommendations and applying targeted applicants to selected field locations.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. a well or water line). The essential function of an irrigation machine is to apply an applicant (i.e. water or other solution) to a given location.

Traditionally, growers will map a field using field scouting, satellite, unmanned aerial vehicle (UAV) and/or micro air vehicle (MAV) images. Then the grower or a third party will analyze the data and create a prescription for an entire field. However, present systems are limited to providing a single prescription for each area of a given field. Additionally, present systems require multiple passes over a field to collect information and apply applicants. For operators, these systems are often imprecise and wasteful since they cannot work in real-time. Additionally, they require additional fuel to apply each applicant in a different pass. Often, these system require operators to over-apply applicants rather than properly targeting a correct applicant to a correct field location.

In order to overcome the limitations of the prior art, a system is needed which is able to effectively apply chemicals utilizing irrigation machines without compromising the ability of the irrigation machines to apply irrigation water effectively and efficiently. Further needed is a system capable of integrating both a mobile data collection systems and a mobile precision product delivery system.

SUMMARY OF THE DISCLOSURE

To minimize the limitations found in the prior art, and to minimize other limitations that will be apparent upon the reading of the specifications, the present invention provides a system, method and apparatus for providing variable rate application of applicants to discrete field locations.

According to a first preferred embodiment, the present invention includes a control device having software modules to allow for the execution of irrigation and chemical spray patterns according to specific prescriptions for each crop being sprayed. According to further preferred embodiments, the control device may use data from a variety of image sensors to create a selective, variable rate application of applicants. Using the imaging data, the system of the present invention may use a primary application system to broadly deliver a first selected applicant (e.g. water or the like) and use a separate system to deliver targeted applicants for specific plants or areas of a given field.

According to further preferred embodiments, the control device of the present invention may specifically control groups and/or individual emitters as required for each application. Accordingly, the control device 121 may instruct elements (i.e. valves, pumps, regulators) to provide a given applicant to a specific area of a given field based on an optically recognized plant condition (e.g. an infestation, disease, poor health). Preferably, the system of the present invention may allow general water irrigation for an entire field while simultaneously spot treating areas of need based on detected conditions as discussed further below.

DESCRIPTION OF THE PREFERRED EMBODIMENTS

Reference is now made in detail to the exemplary embodiments of the present invention, examples of which are illustrated in the accompanying drawings. Wherever possible, the same reference numbers will be used throughout the drawings to refer to the same or like parts. The descriptions, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom including volatile storage such a RAM, buffers, cache memory, and signals within network circuits.

Aspects of the systems and methods described herein may be implemented as functionality programmed into any of a variety of circuitry, including programmable logic devices (PLDs), microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Additionally, the functions of the disclosed embodiments may be implemented on one computer or shared/distributed among two or more computers in or across a network or a cloud.

Communications between computers implementing embodiments may be accomplished using any electronic, optical, radio frequency signals, or other suitable methods and tools of communication in compliance with known network protocols. For example, the present invention may include an RF module for receiving and transmitting electromagnetic waves, implementing the conversion between electromagnetic waves and electronic signals, and communicating with the communication network or other devices. The RF module may include a variety of existing circuit elements, which perform functions, such as antennas, RF transceivers, digital signal processors, encryption/decryption chips, the subscriber identity module (SIM) card, memory, etc. The RF module can communicate with a variety of networks such as the Internet, intranets, wireless network and communicate to other devices via wireless network.

Figure 1:
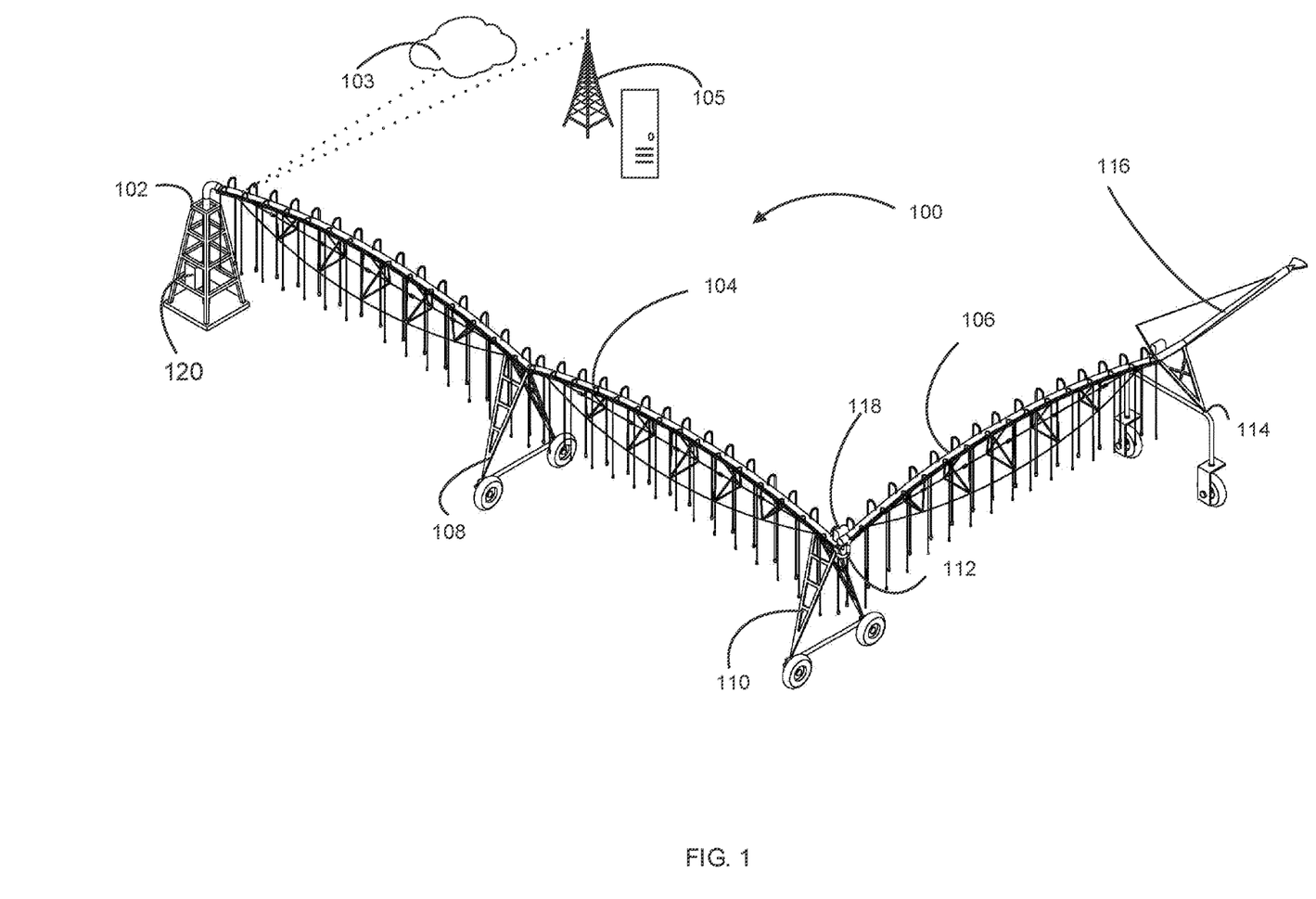
FIG. 1 shows an exemplary irrigation system in accordance with a first preferred embodiment of the present invention.

FIGS. 1-10 illustrate various configurations of irrigation systems which may be used with example implementations of the present invention. As should be understood, the irrigation systems shown in FIGS. 1-10 are exemplary systems onto which the features of the present invention may be integrated. Accordingly, FIGS. 1-10 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way.

With reference now to FIG. 1, an exemplary irrigation machine 100 of the present invention preferably may include a main span 104, a center pivot structure 102 and supporting drive towers 108, 110. The exemplary irrigation machine 100 may also include a corner span 106 attached at a connection point 112. The corner span 106 may be supported and moved by a steerable drive unit 114. The corner span 106 may include a boom 116 and an end gun (not shown) and/or other sprayers. Additionally, a position sensor 118 is preferably provided to provide positional and angular orientation data for the system as discussed further below. Further, a central control panel 120 is provided for enclosing on-board computer elements such as elements of the exemplary control device 121 discussed below. The control panel 120 may also be linked to a transceiver for transmitting and receiving data between system elements, device/internet clouds 103, remote servers 105 and/or the like.

Figure 2:
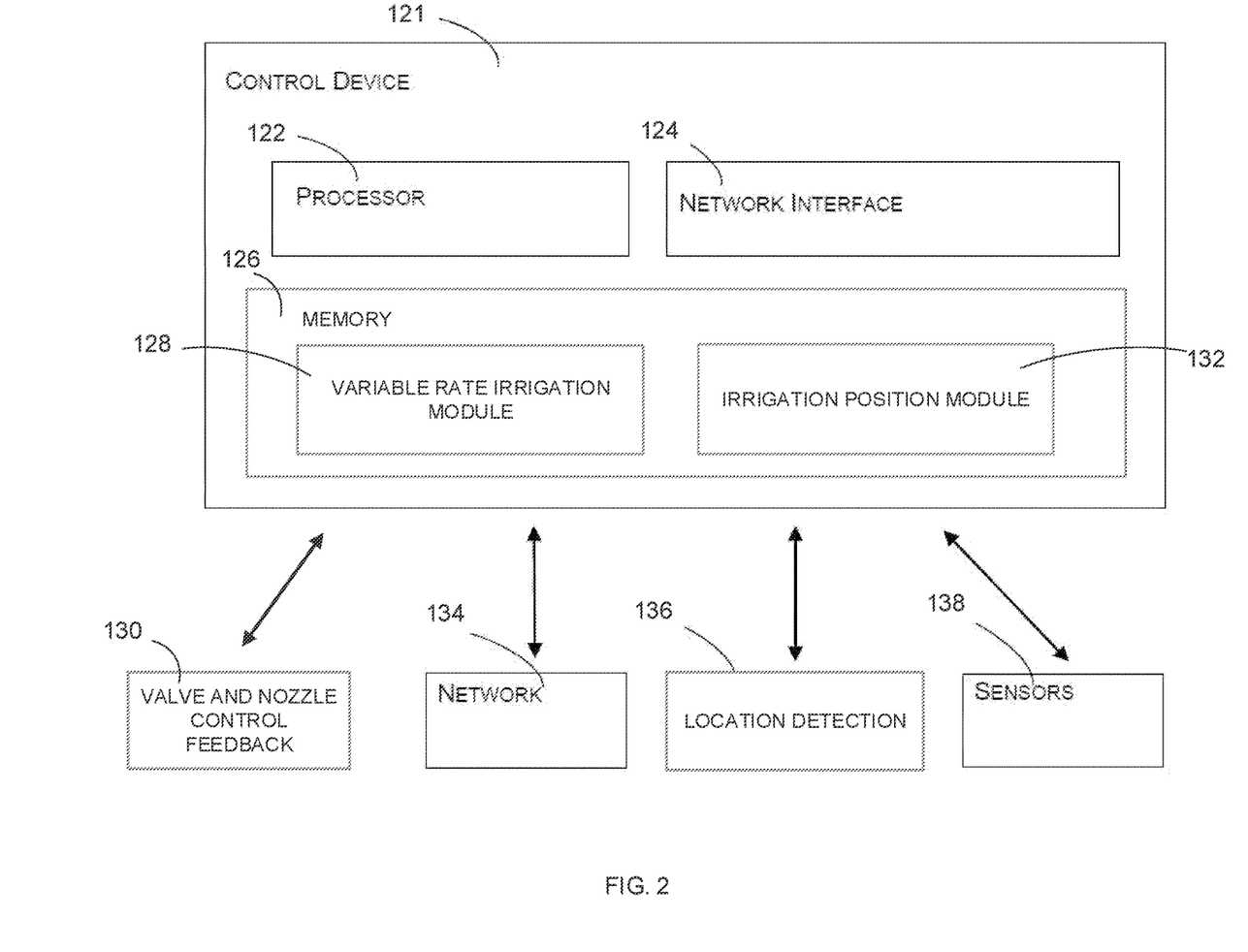
FIG. 2 shows an exemplary control system in accordance with a first preferred embodiment of the present invention.

With reference now to FIG. 2, an exemplary control device 121 which represents functionality to control one or more operational aspects of the irrigation system 100 will now be discussed. As shown, the exemplary control device 121 may include a processor 122, a memory 126 and a network interface 124. The processor 122 may provide processing functionality for the control device 121 and may include any number of processors, micro-controllers, or other processing systems. The processor 122 may execute and the memory may store one or more software programs, as well as other data, to allow the processor 122 and other elements of the control device 121 to implement techniques described herein. The memory 126 may further provide storage for sets of instructions and modules such as, for example, a variable rate irrigation (VRI) module 128 to calculate and control the timing and disbursement of applicants through the irrigation system. The memory 126 may also include an irrigation positioning module 132 or the like to provide mapping and positional data to the system. The control device 121 may also include a network interface 124 or the like to enable the control device 121 to communicate with one or more networks 134 through a variety of components both internal and external to the irrigation machine. Preferably, the system includes one or more location detection devices 136 (e.g. GPS, LORAN, or the like) to provide location data. The system also preferably includes a valve and nozzle control/feedback system 130 to allow for control of irrigation elements and multiple inputs/outputs to receive data from sensors 138 and monitoring devices as discussed further below.

Figure 3:
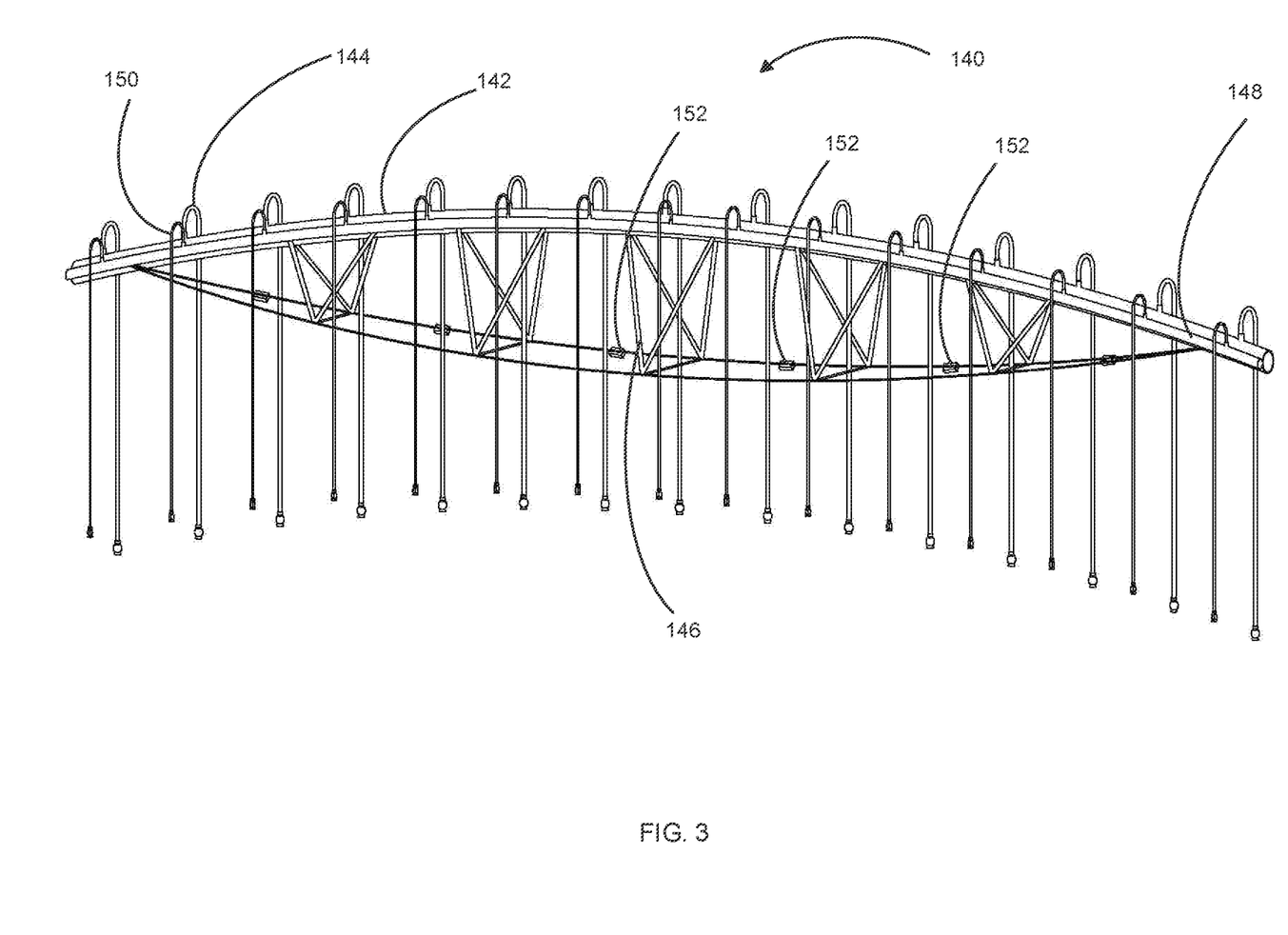
FIG. 3 shows a front view of an improved irrigation span assembly in accordance with a preferred embodiment of the present invention.
Figure 4:
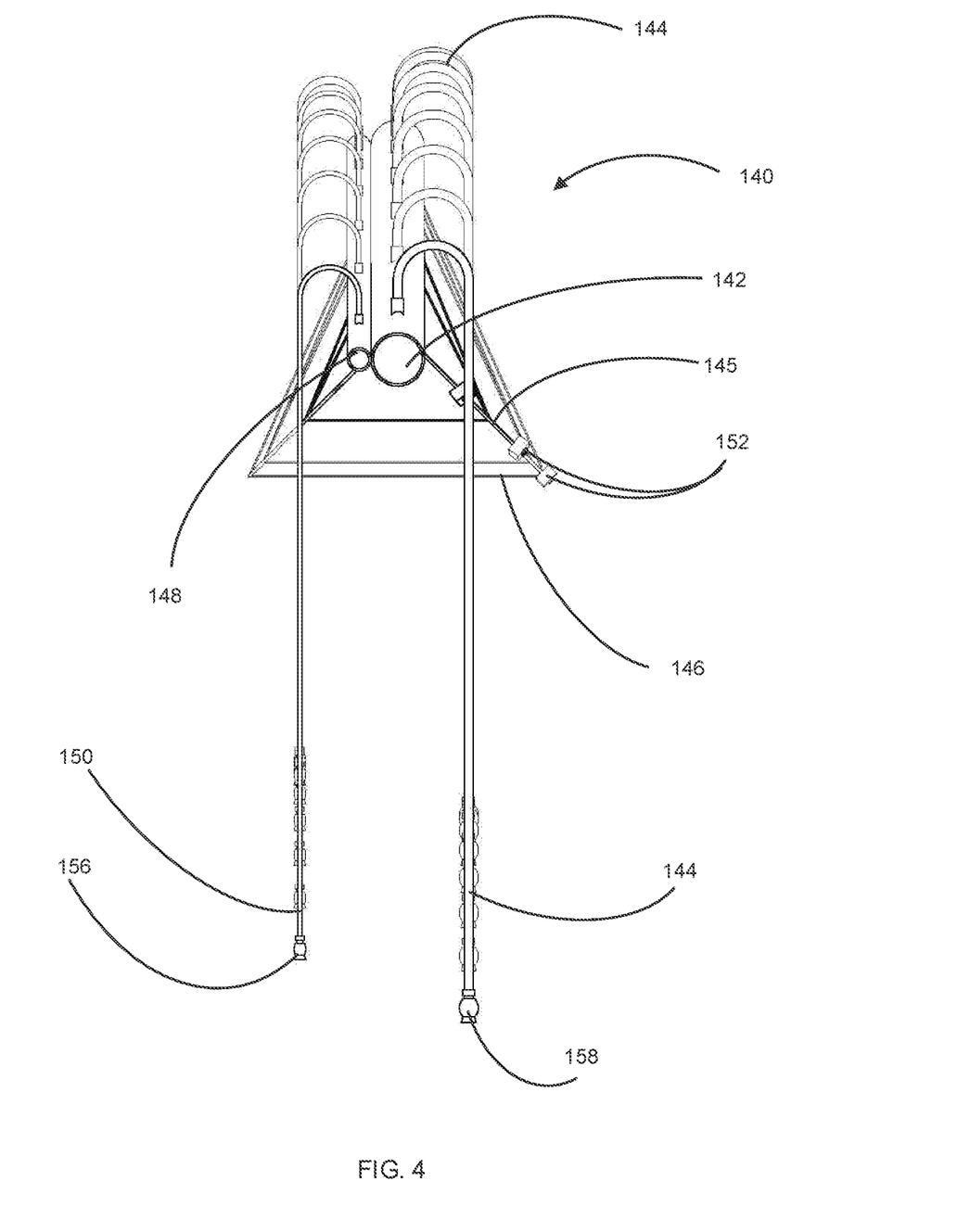
FIG. 4 shows a side view of the improved irrigation span assembly shown in FIG. 3.

With reference now to FIGS. 3-4, an enlarged view of an exemplary span 140 of the present invention is shown. As shown, an exemplary span 140 of the present invention preferably includes a main irrigation conduit 142 supported by groups of irrigation support trusses 146. The main irrigation conduit 142 as shown includes a group of main irrigation sprinklers 144. As further shown, the exemplary span 140 also includes a separate crop product conduit 148 with one or more crop product sprayers 150 as well as image sensors 152 positioned on a front edge of the span 140.

According to preferred embodiments, the sensors 152 of the present invention may include imaging sensors to allow for the detection of crop type, stage of grown, health, presence of disease, rate of growth and the like. Still further, the system may include soil or plant sensors (not shown). Each sensor 152 may also include or interface with a wireless transmitter/transceiver for receiving and transmitting signals between each sensor 152 and the control panel 120 and/or control device 121. According to alternative preferred embodiments, the system may also use a power line carrier system or separate wired network to transmit signals between system elements. As shown in FIGS. 4-7, the imaging sensors 152 may be secured to the truss rods 145. Alternatively, the imaging sensors 152 may be attached to portions of the irrigation support truss system 146 to the irrigation conduit 142 or to any other structural component on the irrigation span.

According to an alternative preferred embodiment, the crop product sprayers 150 may be sprayers which include individually controllable valves (not shown) which are operable to provide exact amounts of a given applicant in response to a transmitted treatment prescription. As shown, the crop product sprayers 150 may be in fluid communication with a dedicated crop product conduit 148. The product(s) being applied by the crop product sprayers 150 may include any range of irrigation, fertigation or chemigation products. The sprayers 150 preferably further include nozzles 156 sized for specific applications.

According to preferred embodiments, the crop product conduit 148 may preferably be able to receive water, chemicals and other applicants under pressure from a variety of tanks (or reservoirs) via individual injection pumps and control valves. Preferably, the pumps and valves may be selectively controlled to control the input of applicants into the crop product conduit 148 and into each crop product sprayer 150 and/or mobile applicator 162. Preferably, the valves may be non-return valves, reduced pressure backflow preventers or the like and may include solenoids to allow for the individual control of each valve. As further shown, an exemplary irrigation system 140 may include combinations of transducers and control valves to monitor and control applicant pressures and flow rates delivered to each crop product sprayer 150 and/or mobile applicator 162. According to preferred embodiments, the valves and/or solenoids used for flow rate may be controlled by a control system which may transmit signals via pulse width modulation (PWM) TCP/IP, UDP or a similar signal transmission technique either wired or wirelessly. The system may further include a cleaning system to flush the crop product conduit 148 and sprayer 150 and/or mobile applicator 162. According to further preferred embodiments, the crop product conduit 148 and sprayer 150 and/or mobile applicator 162 may be formed of materials which are resistant to chemical and UV exposure.

Figure 6:
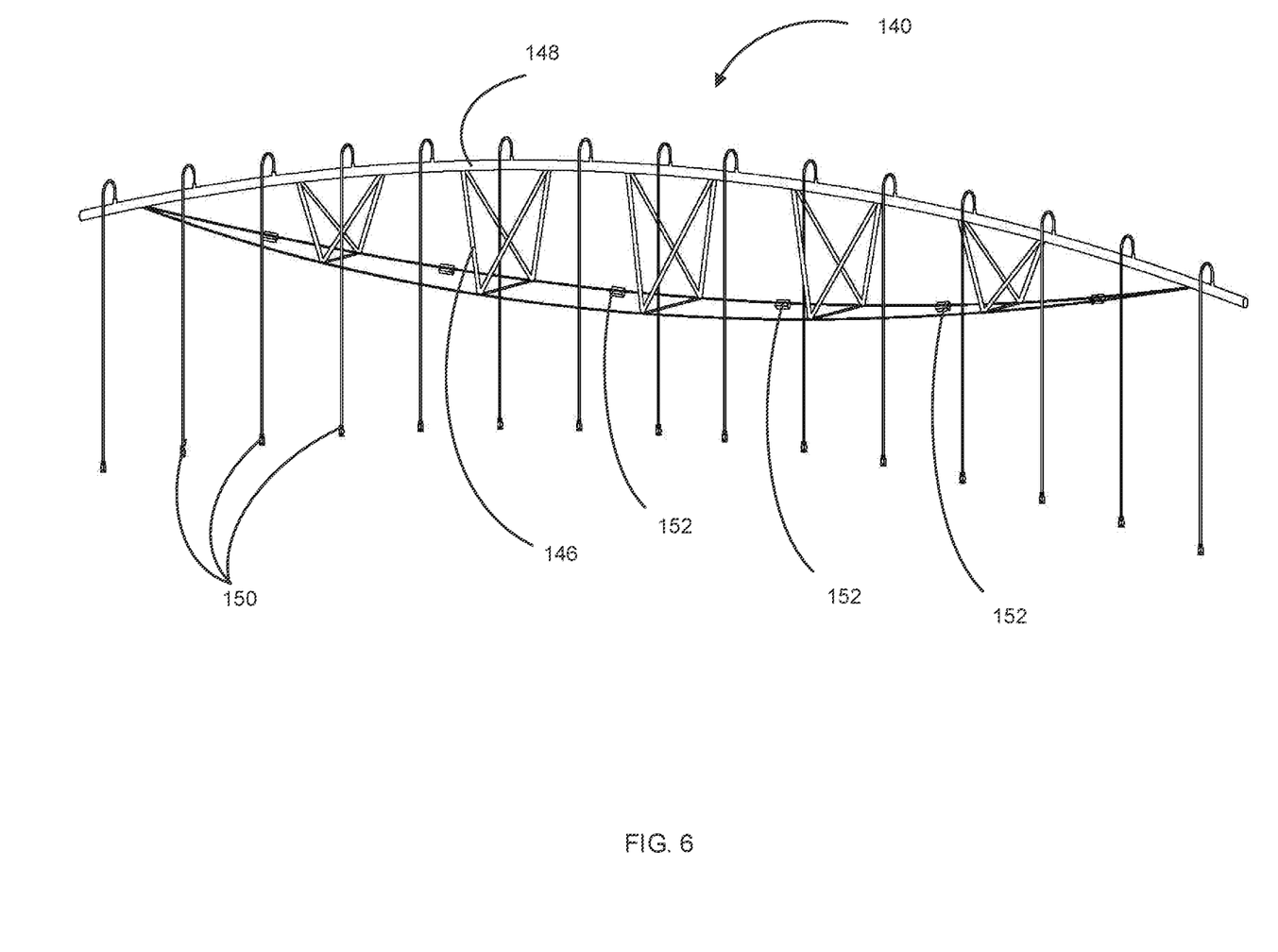
FIG. 6 shows a perspective view of the crop product conduit assembly of the present invention.
Figure 7:
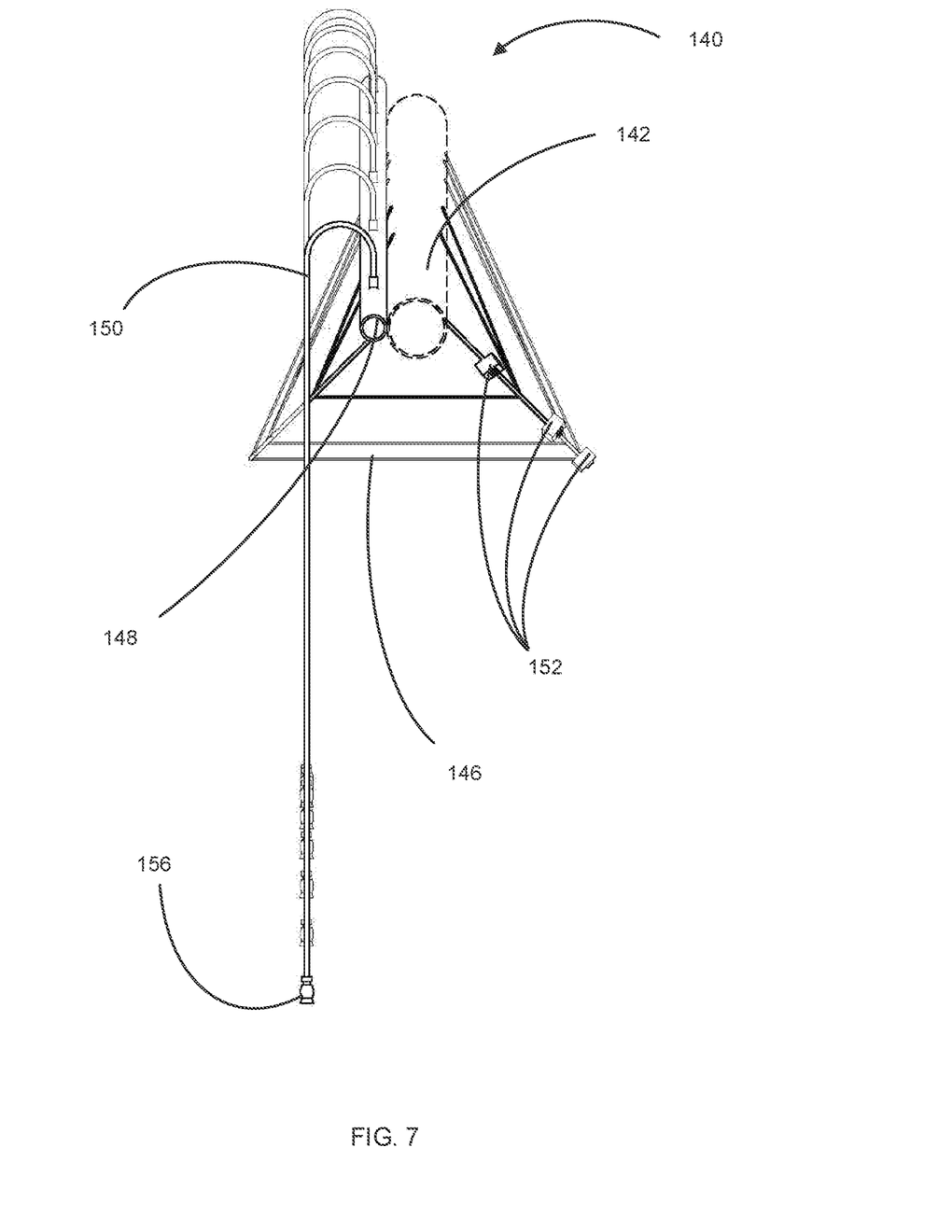
FIG. 7 shows a side, perspective view of the crop product conduit assembly shown in FIG. 6.

As shown in FIG. 4, the main irrigation conduit 142 may be attached and/or located together with the crop product conduit 148. The crop product sprayers 150 may also include valves and nozzles 156 which may be controlled independently from the main applicant nozzles 158. For illustration, FIGS. 6 and 7 provide views of the exemplary irrigation span 140 with only the crop product conduit 148, sprayers 150, and image sensors 152 shown. For the sake of clarity, selected elements such as additional water, control and power lines are not shown.

Figure 5:
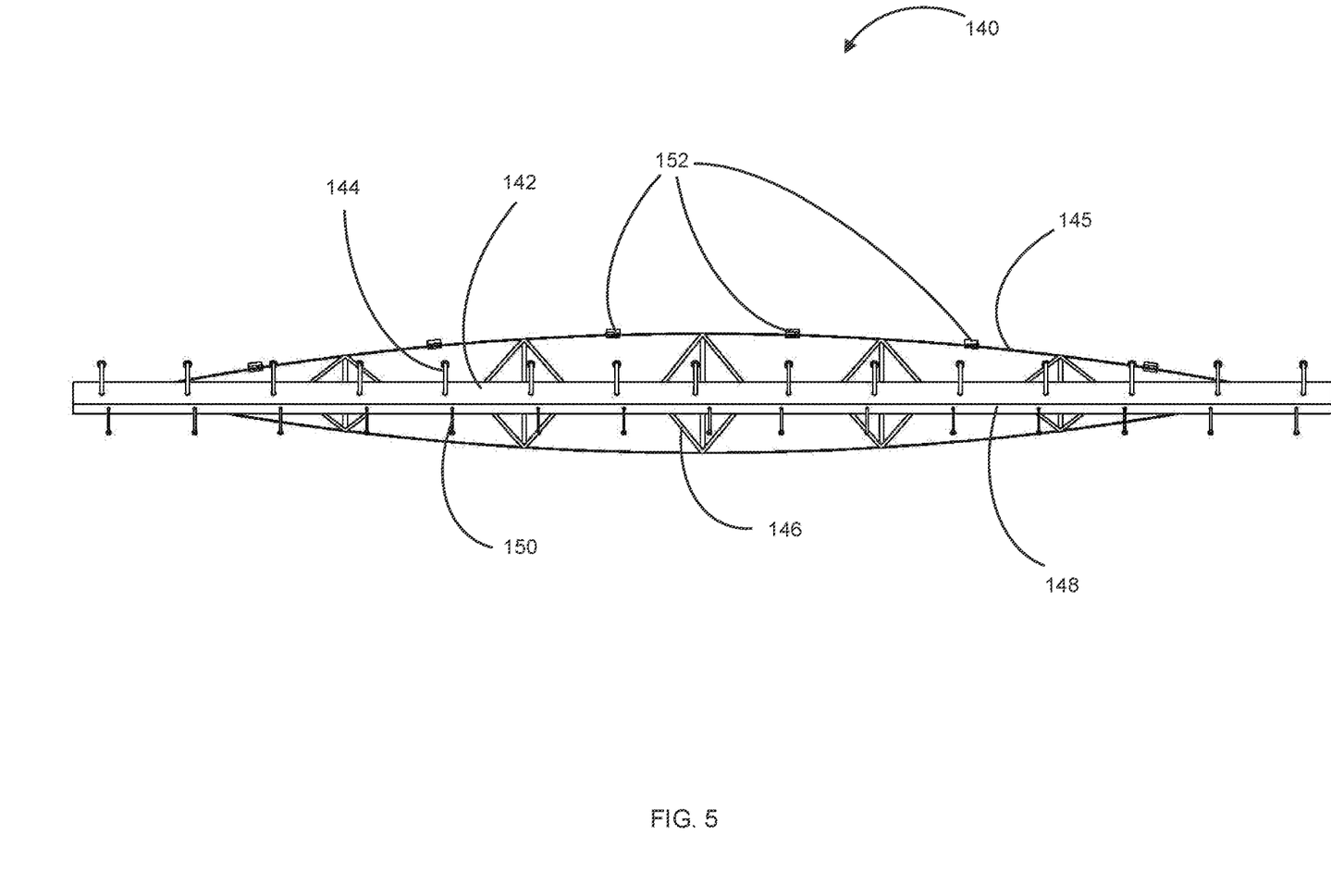
FIG. 5 shows a top-down view of the improved irrigation span assembly shown in FIG. 3.

Referring now to FIGS. 3-5, an exemplary method of operation shall now be discussed. In operation, the image sensors 152 of the present invention may preferably be located on a leading edge of a given span to scan areas in the direction of travel. As discussed above, the image sensors 152 are preferably calibrated to detect specific field conditions, crop conditions, crop health and the like. According to alternative preferred embodiments, the image sensors 152 may be in fixed positions or may be movable to scan areas of interest as discussed further below.

The data collected by the image sensors 152 may be processed by an on-board computer located within the sensor 152 itself, the control box 120 and/or transmitted to a remote device/internet cloud 103, remote server 105 or the like as discussed above. Preferably, the data may be processed to determine specific needs and prescription recommendations for each scanned area. According to a preferred embodiment, the analysis of the image data may include identification of weeds, insects, diseases, nutrient deficiencies and crop growth stages/rates at specific locations in a given field. Thereafter, the resulting prescriptions/watering recommendations derived from the image data may preferably be received and processed for execution by the crop product sprayers 150 mounted on the irrigation assembly. Preferably, the execution of a given prescription by the crop product sprayers 150 may occur simultaneously with the execution of an overall prescription/watering plan by the primary irrigation system (e.g. the main conduit 142, irrigation sprinklers 144) or may occur independently (particularly if no additional water is required by the crop).

According to a first preferred embodiment, the crop product sprayers 150 are preferably separate from the main irrigation conduit 142 and main irrigation sprinklers 144. In this way, the crop product sprayers 150 may preferably operate to provide targeted concentrations of crop treatments to selected areas of a given field while the primary irrigation system applies a full treatment to a larger area of the field. According to an alternative preferred embodiment, the control device 121 of the present invention may receive imaging data during the execution of a prescription/watering plan by the primary irrigation system. The control device 121 may then simultaneously (i.e. in real or near-real time) instruct/control the crop product irrigation system (e.g. the crop product conduit 148 and crop product sprayers 150) to create and/or execute the disbursement of an applicant to a target area based on the received image data.

According to a further preferred embodiment, the control device 121 may also use the imaging data (or other inputs) to make continual adjustments to the overall prescription/watering plan while also adjusting/executing the targeted disbursement of applicants via the crop product irrigation system. The control device 121 may further analyze the targeted disbursement plan of the crop product irrigation system to create an adjustment in the amount of primary applicant applied to a given area. For example, if the imaging sensors 152 detect the presence of a plant disease (i.e. brown patch) which requires a supplemental applicant (i.e. grub killer), the system may preferably create and execute a targeted prescription plan to apply a supplemental applicant to the targeted area via the crop product irrigation system to treat the detected disease. At the same time, the system may adjust the primary irrigation system to reduce or increase the amount of the primary applicant applied to enhance the effectiveness of the supplemental applicant.

Figure 8:
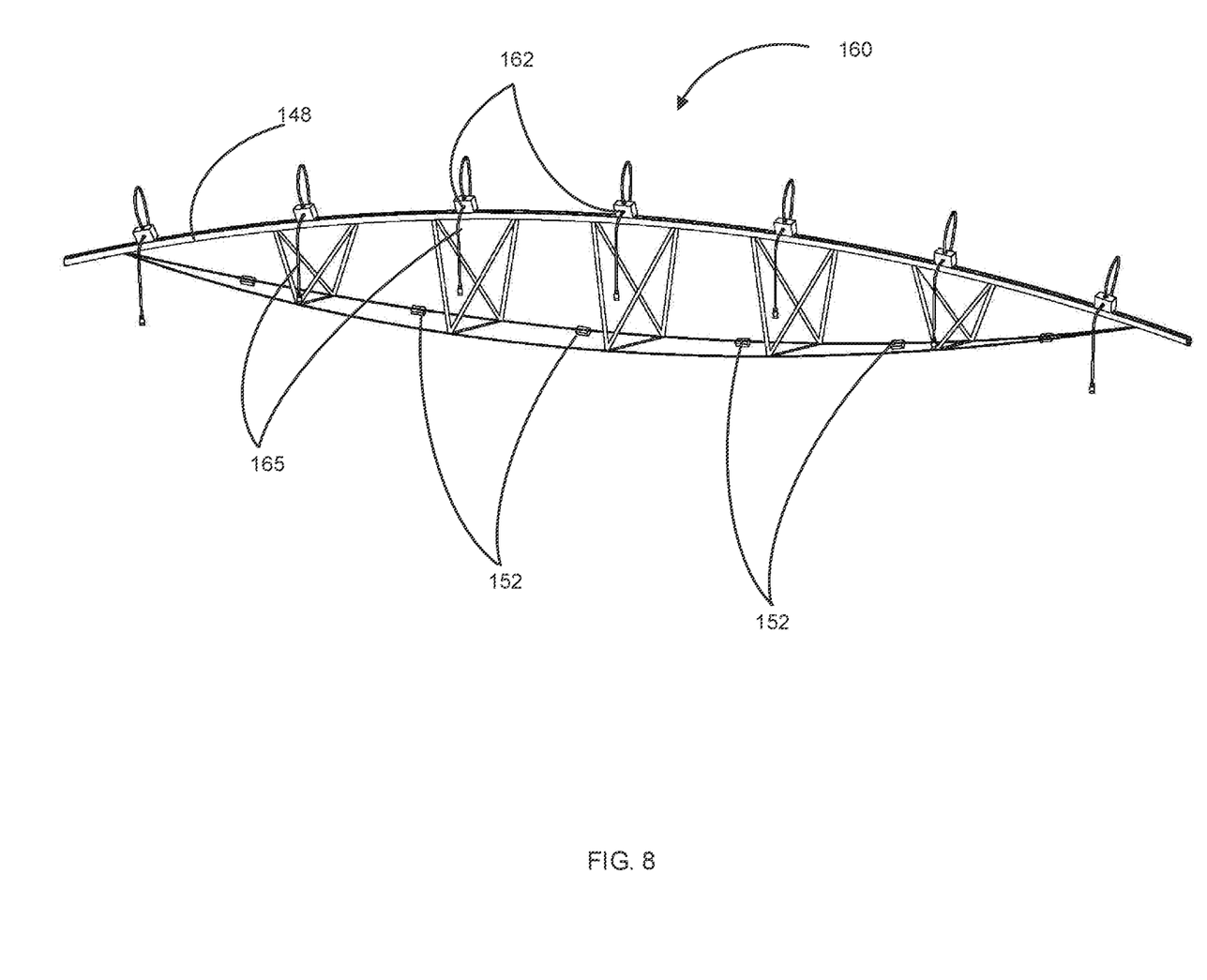
FIG. 8 shows a perspective view of the crop product conduit assembly of the present invention.
Figure 9:
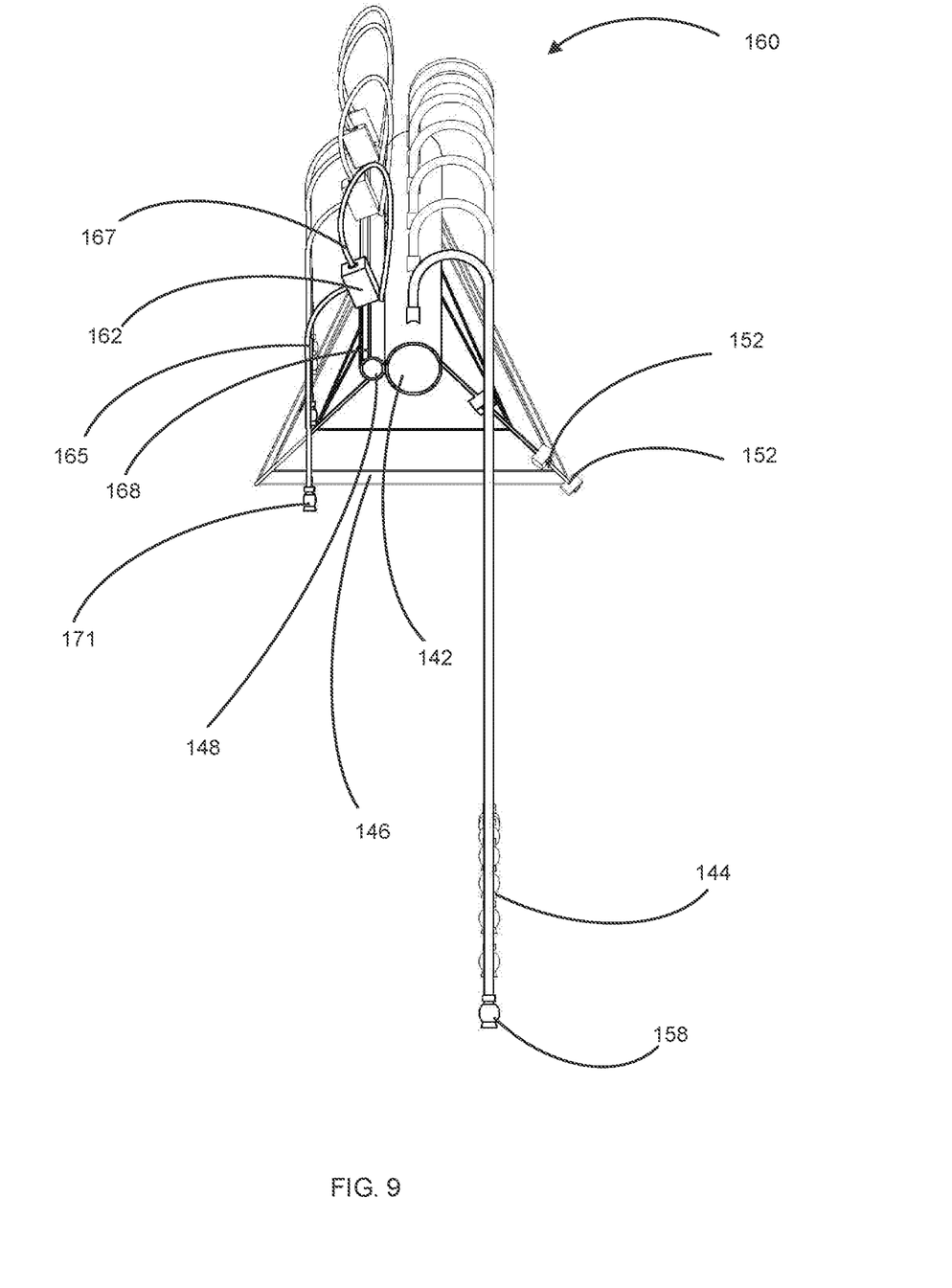
FIG. 9 shows a side, perspective view of the crop product conduit assembly shown in FIG. 8.
Figure 10:
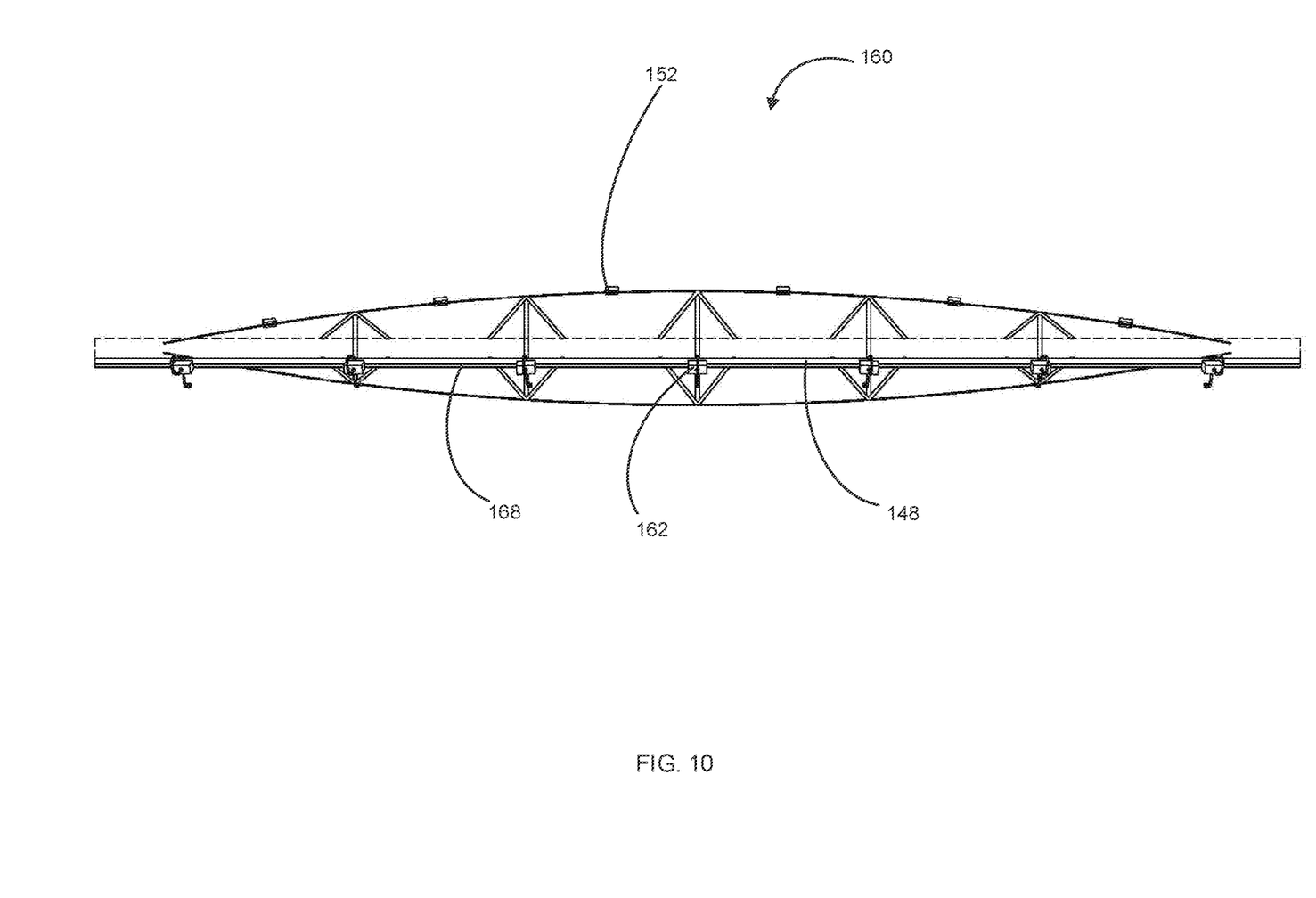
FIG. 10 shows a top-down view of the improved irrigation span assembly shown in FIG. 9.

With reference now to FIGS. 8-10, as mentioned above the crop product sprayers 150 may be replaced by or used in addition to mobile applicators 162. As shown, exemplary mobile applicators 162 may include dedicated sprayers 165 and nozzles to selectively apply applicants to selected areas of a given filed. Preferably, the mobile applicators 162 may be arranged to spray over selected distances along the length of the crop product conduit 148 to reduce the needed travel distance and improve reaction times during irrigation. According to a preferred embodiment, the movement and speed of the mobile sprayers 162 along the length of the crop product conduit 148 may be determined and adjusted based on the detected travel speed of the irrigation system and/or the position of the sensor along the pipeline to ensure uniform data collection and uniform product application.

As shown in FIGS. 9 and 10, the mobile applicators 162 may run within a track 168 secured on or near the crop product conduit 148. As shown in FIG. 8, the mobile applicators 162 are preferably in fluid communication with the crop product conduit 148 via dedicated supply lines 167 or the like. The dedicated supply lines 167 are preferably of sufficient length and/or flexibility to allow the mobile applicators 162 to travel over a given lateral distance. The mobile applicators 162 may preferably each include an applicator 165 and a controllable/adjustable nozzle 171 for applying applicants to target areas of a given field.

According to further aspects of the present invention, the mobile applicators 162 may further be in data communications with the main irrigation controller and/or other systems of the main watering system. Additionally, the mobile applicators 162 may adjust the concentrations of applied chemicals based on various VRI application parameters (e.g. historic and scheduled water application rates, irrigation machine speeds, flow rates, water pressures etc.) for each plant area/plant/row/irrigation zone of a given field. Further, the mobile applicators 162 may communicate with the irrigation control systems (controllers) to increase or reduce water application rates for selected, target locations (e.g. treated plant areas/rows/irrigation zones) in coordination with targeted chemical applications.

According to further aspects of the present invention, the system of the present invention may preferably further store location data for any diseased location along with any chemical treatments applied and any data regarding watering adjustments made for the location. On later watering applications for the same target location(s), the irrigation system may preferably increase/decrease the watering rate and/or chemical application concentrations to adjust for any reduced or increased water application rates made to the same location.

The scope of the present invention should be determined not by the embodiments illustrated, but by the appended claims and their legal equivalents.

What is claimed is:

1. A system for providing variable rate application of applicants to field locations, the system comprising:
   an image sensor for providing crop image data;
   a chemical application system comprising a main chemical conduit, a plurality of chemical sprayer pipes, a plurality of chemical sprayer valves and a plurality of chemical sprayer nozzles;
   a water delivery system comprising a primary conduit, a plurality of water pipes, a plurality of water sprayer valves and a plurality of water sprayer nozzles;
   a controller for the chemical application system and the water delivery system configured to: receive the crop image data; execute a first variable rate irrigation (VRI) prescription plan by directing a first applicant through the water delivery system; create a second VRI prescription plan for applying a second applicant to selected areas of the given field via the chemical application system based on analysis of the received crop image data; initiate the execution of the second VRI prescription plan; and
   a system cleaning valve; wherein the system cleaning valve is movable between a first closed position and a second open position; wherein the system cleaning valve restricts the flow of water into the chemical application system when in the first closed position.

2. The system of claim 1, wherein the controller is configured to initiate the execution of the second VRI prescription plan during the execution of the first VRI prescription plan.

3. The system of claim 2, wherein the controller is configured to create the second VRI prescription plan based at least in part on analysis of the crop image data indicating a stage of growth for the crop.

4. The system of claim 3, wherein the controller is configured to create the second VRI prescription plan based at least in part on analysis of the crop image data indicating the presence of disease.

5. The system of claim 4, wherein the controller is configured to create the second VRI prescription plan based at least in part on analysis of the crop image data indicating a rate of growth.

6. The system of claim 5, wherein the system comprises a soil sensor.

7. The system of claim 6, wherein the system comprises a wireless transceiver configured to transmit and receive signals between the image sensor and the controller.

8. The system of claim 7, wherein the image sensor is movably secured to an irrigation span.

9. The system of claim 8, wherein at least a first chemical sprayer valve is individually controllable; wherein the controller is configured to adjust a first chemical flow rate of the first chemical sprayer valve to apply a first prescribed amount of a chemical applicant in response to the second VRI prescription plan.

10. The system of claim 9, wherein at least a first water sprayer valve is individually controllable; wherein the controller is configured to adjust a first water flow rate of the first water sprayer valve in response to the second VRI prescription plan.

11. The system of claim 9, wherein, the image sensor is movable between a first position and second position.

12. The system of claim 11, wherein the image sensor has a first rate of movement based on a first speed of the irrigation system; wherein the image sensor has a second rate of movement based on a second speed of the irrigation system; wherein the first rate of movement is faster than the second rate of movement.

13. The system of claim 12, wherein the image sensor is configured to move at a third rate of speed based on a first set of image data detected by the image sensor; wherein the image sensor is configured to move at fourth rate of speed based on a second set of image data detected by the image sensor; wherein the third rate of speed is slower than the fourth rate of speed.

14. The system of claim 13, wherein the image sensor comprises an image sensor housing; wherein the image sensor housing encloses a wireless transceiver; wherein the image sensor is configured to transmit image data to a remote location.

15. An irrigation system for providing applicants to discrete field locations, the irrigation system comprising:
   a chemical application system comprising: a main chemical conduit; a plurality of chemical sprayer tubes; and a plurality of mobile application sprayers;
   wherein at least a first mobile application sprayer is in fluid communication with at least a first chemical sprayer tube;
   wherein the first application sprayer comprises: a sprayer; an imaging system, a motor system and an application sprayer controller;

wherein the first mobile application sprayer is movably attached to a first truss element;
wherein the first mobile application sprayer is configured to move laterally across a length of an irrigation span;
a water delivery system, wherein the water delivery system is comprised of a main irrigation controller; and
a system cleaning valve; wherein the system cleaning valve is movable between a first closed position and a second open position; wherein the system cleaning valve restricts the flow of water into the chemical application system when in the first closed position.

16. The system of claim 15, wherein the application sprayer controller of the first application sprayer is configured to receive image data from the imaging system; wherein the application sprayer controller is configured to identify a first diseased location on a plant.

17. The system of claim 16, wherein the application sprayer controller is configured to move the sprayer into a location to spray the first diseased location.

18. The system of claim 17, wherein the first application sprayer is configured to spray a chemical applicant onto the first diseased location.

19. The system of claim 18, wherein the application sprayer controller is configured to receive a water application rate from the main irrigation controller.

20. The system of claim 19, wherein the first application sprayer is configured to adjust the concentration level of the chemical applicant based at least in part on the water application rate.

21. The system of claim 20, wherein the irrigation system is configured to reduce the water application rate for the first diseased location selected for treatment by the first application sprayer.

22. The system of claim 20, wherein the irrigation system comprises a memory for storing a first location of at least the first diseased location; wherein the application sprayer controller is configured to recall the first location to determine at least in part a concentration level of a later chemical application.

23. The system of claim 15, wherein the image sensor comprises an image sensor housing; wherein the image sensor housing encloses a wireless transceiver; wherein the image sensor is configured to transmit image data to a remote location.

* * * * *